3,085,874
METAL PURIFICATION PROCESS
John T. Kelley, Grand Island, N.Y., assignor to Union Carbide Corporation, a corporation of New York
No Drawing. Filed Aug. 5, 1958, Ser. No. 753,183
22 Claims. (Cl. 75—84.4)

This invention relates to a process for purifying reactive refractory metals which are contaminated by their own halides, alkali metals, alkaline earth metals, alkali metal halides and/or alkaline earth metal halides.

A present practice for the production of the reactive refractory metals of groups IVB, VB and VIB of the periodic table (Handbook of Chemistry and Physics, 31st edition, page 336, 1949, Chemical Rubber Publishing Company) comprises reacting a halide of the reactive refractory metal with a suitable reducing metal, generally an alkali or alkaline earth metal. The process is generally conducted with either one or both of the reactants being in the liquid or the vapor phase. In some instances the reducing metal is utilized in the solid state. The product obtained by the reaction is commonly a solid refractory metal in the form of a metal sponge with minor amounts of the reactants and the alkali metal and alkaline earth metal halides produced by the reaction trapped within the metal sponge.

Since most of the contaminants in the metal sponge are water-soluble, and since the metal produced is water-insoluble, it would appear to be a simple matter to remove the impurities by aqueous leaching. However, this leaching procedure is complicated by a series of side reactions which produce further impurities that are detrimental to the metal product. For example, a subhalide of titanium tends to hydrolyze in the presence of water to produce an insoluble titanium hydroxide which precipitates in the pores of titanium metal sponge, which precipitate is extremely difficult to remove. The presence of the reducing metal in the titanium sponge prevents a water leaching of the product since the reducing metal reacts with water to produce hydrogen. The evolved hydrogen is absorbed by the metal sponge and produces a serious embrittling effect on the metal.

To avoid the possibility of the reducing metal being present in the final product, it is customary procedure to employ an excess of the reactive refractory metal halide over that stoichiometrically required for the reaction, thereby tending to minimize the quantity of reducing metal in the final product. However, the final result of such a procedure is to produce a product containing subhalides of the reactive refractory metal which are entrapped in the metal sponge. While it is now possible to use an aqueous acid solution to leach the sponge, the acid serving to prevent the hydrolysis reaction, the subhalides react with water in a standard oxidation-reduction reaction to produce higher valent reactive refractory metal cations and evolve hydrogen. Again this hydrogen serves to embrittle the metal and, therefore, it would be desirable to eliminate this reaction.

Included among the methods which have been employed to depress the subhalide-water reaction are the use of aqueous leaching solutions containing oxidants and the use of complexing agents. Among the oxidants which have been employed in this method are ferric chloride, sodium nitrate, nitric acid, potassium dichromate, potassium permanganate and quinone. Slight quantities of these oxidants in an acid leaching solution have been found to reduce the hydrogen content of the titanium product by counteracting the tendency for the lower valent reactive refractory metal cations to go to a higher oxidation state. Mineral acid solutions containing soluble formates or oxalates have been found to be suitable complexing agents for forming a complex compound between the lower valent reactive refractory metal cations and the formate or oxalate anions, thereby depressing the tendency for oxidation of the cations to a higher valent state.

Both of these methods rely upon the leaching of an acidic reaction product, that is, one containing subhalides of the reactive refractory metals rather than reducing metals. In practice, however, it is for all practical purposes impossible to obtain a homogeneous product, and the reaction mass will generally contain some regions of subhalides and others of unreacted reducing metals even though the initial reaction was carried out with a stoichiometric excess of either one of the reactants. This arises from the difficulty of obtaining satisfactory agitation of the reaction mixture and because of the high reaction rate.

Mechanical agitation has been found to be unsatisfactory for many reasons. To operate and properly lubricate bearings necessary for impeller-type agitation at the high temperature at which the reaction proceeds satisfactorily is an extremely difficult undertaking in view of the corrosive nature of the materials involved. At these high temperatures a long, unsupported shaft would lose its strength and rigidity. When it is further considered that one of the reaction products is a solid which tends to deposit on the impeller, it may be seen that mechanical agitation is not a satisfactory form of agitation.

It has been suggested that the reaction be carried out in a liquid state with violent injection of the reactants being employed to produce the necessary agitation. Another method employs vapor phase reaction of both reactants. However, neither of these methods has resulted in effecting the theoretical stoichiometric reaction and, in every case, a heterogeneous product is obtained containing unreacted metal and partially reacted reactive refractory metal halides.

It may thus be seen that, even though the hydrolysis reaction and the oxidation-reduction reaction between the subhalides and water may be satisfactorily depressed, the heterogeneous product containing basic regions may still give rise to a hydrogen-forming reaction during leaching when the leaching solution contacts the reducing metal in the basic regions of the reaction product.

Accordingly, it is an object of this invention to provide a process for purifying reactive refractory metals which is suitable for use whether the contaminants are subhalides of the reactive refractory metal, alkali and/or alkaline earth metals and/or alkali and/or alkaline earth metal halides.

Other objects will be apparent from the subsequent disclosure and appended claims.

The process which satisfies the objects of the present invention comprises leaching the contaminated reactive refractory metal with an aqueous acid solution containing from about 0.25 weight percent up to the limit of solubility of at least one water-soluble additive selected from the group consisting of reducing sugars, aldoses, ketoses, keto-acids, the corresponding lactones of said keto-acids, keto-hydroxy acids, the corresponding lactones of said keto-hydroxy acids, sugar acids, the corresponding lactones of said sugar acids, furan derivatives wherein the furan ring is intact, and pyran derivatives wherein the pyran ring is intact, whereby the impurities are removed from the reactive refractory metal without substantial evolution of hydrogen.

It has not been ascertained by what mechanism the leaching solution of the present invention surpresses hydrogen evolution. However, it is believed that it is probably by chelation or chemical reaction with the hydrogen-forming impurities.

Operable reducing sugars for the present invention include glucose, mannose, and arabinose.

Illustrative of the aldoses which are preferred for use in the present invention are mannose and arabinose.

Fructose and sorbose are the preferred ketoses.

Among the keto-acids, pyruvic acid and levulinic acid are preferred.

The preferred keto-hydroxy acid is 2-keto gluconic acid.

The sugar acids are subdivided into the glyconic acids, the glycuronic acids, and the glycaric acids.

The glyconic acids may be characterized as aldoses wherein the aldehyde group has been oxidized to a carboxyl group. Included in this group are mannonic, gluconic, galactonic, arabonic, and gluco-heptonic acids. Gluconic and gluco-heptonic acids are preferred for the purpose of the present invention.

The glycuronic acids may be characterized as aldoses wherein the aldehyde group is intact and the terminal carbon has been oxidized to a carboxyl group. This group of acids includes glucuronic acid and galacturonic acid which are the preferred glycuronic acids for the present process.

The glycaric acids may be characterized as aldoses wherein both the aldehyde group and the primary hydroxyl group are oxidized to carboxyl groups. Included in this group of acids are galactaric (mucic) acid and the preferred glycaric acid, gluco-saccharic acid.

Among the latones of the acids which have been found to be particularly suitable for the process of the present invention are glucono-lactone (the lactone of gluconic acid), glucurono-lactone (the lactone of glucuronic acid), galacturono-lactone (the lactone of galocturonic acid), gluco-heptonic lactone (the lactone of gluco-heptonic acid), and ascorbic acid (tautomeric with the lactone of 2-keto gluconic acid or 2-oxo-L-gulonic acid).

The preferred furan derivative for the purposes of the present invention is furfural.

A typical pyran derivative which is suitable for use in the present invention is cannabinol.

It is unnecessary to employ the leaching agents individually or only in a purified form. It is possible to obtain sugars such as sucrose, which are not suitable in and of themselves for the use in the process of the present invention, and oxidize them to products which are suitable. Sugars such as glucose, which are suitable by themselves may also be oxidized to other more suitable forms. For example, the oxidation products of sucrose and glucose which are equivalent to those obtained by reacting one part by weight of the sugar with 0.7 to 1.0 part by weight of 70 percent nitric acid at a temperature in the range of from about 60° C. up to about 80° C. are suitable for use in the present invention. In the examples shown in Tables I through III, "oxidized sucrose" refers to a solution comprising 5 parts by weight of sucrose dissolved in 1.75 parts by weight of water which had been treated with 4.7 parts by weight of 70 percent nitric acid over a period of six hours with constant agitation of the solution. The product comprises essentially a mixture of gluco-saccharic acid, glucuronic acid, 2-keto-gluconic acid, and the corresponding lactones of the acids. Lesser amounts of gluconic acid and its lactone are obtained. The degree of oxidation is controlled by the amount of acid employed and the temperature maintained during the reaction.

Sucrose and glucose may also be pyrolyzed to produce a suitable leaching additive containing pyran and furan derivatives. For example, when glucose is pyrolyzed by boiling the sugar with concentrated hydrochloric acid, tetrahydroxy methyl furfural is obtained.

In carrying out the invention, the leaching additive is dissolved in an aqueous solution of a mineral acid prior to the leaching operation. The amount of leaching additive required for maximum effectiveness depends upon the amount of lower valent reactive refractory metal subhalides and reducing metal present in the reaction mixture. Satisfactory results are obtainable with from as little as 0.25 weight percent of the leaching additive in the leaching solution up to the limit of solubility of the leaching additive. From about 1.0 weight percent up to about 5.0 weight percent is preferred.

Any mineral acid, organic acid or acid salt may be used as the acid constituent, provided it is sufficiently acidic to prevent hydrolysis of the lower valent halides. Concentrations of from about 0.5 percent to 10 percent hydrochloric acid have been used successfully. A concentration of about 1 percent hydrochloric acid is preferred.

To illustrate the process of the present invention, titanium was prepared by reacting 3840 pounds by weight of molten sodium with 7918 pounds by weight of liquid titanium tetrachloride. This represents the stoichiometric quantities of the reactants necessary to produce the titanium metal. Nevertheless, the reaction product was of a heterogeneous nature and consisted of basic portions (containing unreacted sodium) and acid portions (containing titanium subchlorides). A basic portion of the reaction mass was segregated from the main body and crushed through an 8 mesh standard Tyler screen and was retained on a 48 mesh standard Tyler screen. An acid portion of the main reaction product was treated similarly. Portions of the crushed basic titanium reaction product and the crushed acid titanium reaction product were blended so that three crushed samples were now available; an acid sample, a basic sample, and a blend of the two. Each 100 parts by weight of these samples were subjected to leaching with 350 parts by weight of various solutions comprising 1 percent hydrochloric acid alone, 1 percent hydrochloric acid plus various prior art leaching agents, and 1 percent hydrochloric acid plus several of the leaching additives of the present invention. The leaching was continued for thirty minutes in each case and the hydrogen evolved during that period was collected and measured. The results of these tests are shown in Tables I, II, and III. The hydrogen evolution shown in the tables is based on 100 parts by weight of reaction product leached.

TABLE I

*Acid Reaction Product*

| Leaching agent added to 1% HCl: | Hydrogen evolved, cc. |
|---|---|
| None (1% HCl alone) | 177 |
| 0.25% oxalic acid | 25 |
| 1% ferric chloride | 50 |
| 1% sodium nitrate | 68 |
| 0.25% potassium permanganate | Ppt. formed |
| 1% potassium dichromate | Ppt. formed |
| 0.25% galacturonic acid | 15 |
| 0.25% glucorono lactone | 3 |
| 0.10% oxidized sucrose | 10 |
| 0.25% oxidized sucrose | 8 |
| 1.0% oxidized sucrose | 5 |
| 0.20% fructose | 9.5 |
| 0.5% fructose | 5.5 |
| 1.0% arabinose | 10 |
| 1.0% sorbose | 10 |
| 0.25% gluconic acid | 5 |
| 1.0% gluconic acid | 3 |
| 0.25% glucono lactone | 5 |
| 1.0% glucono lactone | 3 |
| 0.25% glucoheptonic acid | 3 |
| 1.0% glucoheptonic acid | 2 |
| 0.25% glucoheptonic lactone | 3 |
| 1.0% glucoheptonic lactone | 2 |
| 1.0% ascorbic acid | 12 |
| 0.25% sodium gluconate | 8 |
| 1% sodium gluconate | 5 |
| 0.25% furfural | 4 |
| 0.25% furfural | 2 |
| 0.25% pyruvic acid | 2 |

TABLE II

Basic Reaction Product

| Leaching agent added to 1% HCl: | Hydrogen evolved, cc. |
|---|---|
| None (1% HCl alone) | 20 |
| 0.25% oxalic acid | 19.1 |
| 1% oxalic acid | 14 |
| 1% sodium nitrate | 14 |
| 1% ferric chloride | 15 |
| 0.25% oxidized sucrose | 7 |
| 0.10% oxidized sucrose | 10 |
| 0.5% oxidized sucrose | 5 |
| 1.0% oxidized sucrose | 5 |
| 0.25% glucuronic acid | 7 |
| 1.0% glucuronic acid | 5 |
| 0.25% glucurono lactone | 7 |
| 1.0% glucurono lactone | 4 |
| 1.0% mannose | 7 |
| 1.0% arabinose | 10 |
| 1.0% sorbose | 9 |
| 0.25% gluconic acid | 7 |
| 1.0% gluconic acid | 5 |
| 0.25% glucono lactone | 7 |
| 1.0% glucono lactone | 5 |
| 0.25% glucoheptonic acid | 5 |
| 1.0% glucoheptonic acid | 4 |
| 0.25% glucoheptonic lactone | 5 |
| 1.0% glucoheptonic lactone | 4 |
| 0.25% ascorbic acid | 9 |
| 1.0% furfural | 6 |

TABLE III

Blended Reaction Product

| Leaching agent added to 1% HCl: | Hydrogen evolved, cc. |
|---|---|
| None (1% HCl alone) | 102 |
| 1% ferric chloride | 27 |
| 0.25% oxalic acid | 20 |
| 0.25% oxidized sucrose | 6 |
| 1% oxidized sucrose | 4 |
| 0.25% gluconic acid | 6 |
| 1.0% gluconic acid | 7 |
| 0.25% glucono-Δ-lactone | 6 |
| 1.0% glucono-Δ-lactone | 7 |
| 0.25% glucoronic acid | 2 |
| 0.25% glucorono-Δ-lactono | 2 |
| 0.25% glucoheptonic acid | 3 |
| 1% glucoheptonic acid | 2 |
| 0.25% glucoheptonic lactone | 3 |
| 1.0% glucoheptonic lactone | 2 |
| 0.25% sorbose | 8 |
| 0.25% arabinose | 8 |
| 0.25% ascorbic acid | 2 |
| 0.25% pyruvic acid | 2 |
| 0.25% furfural | 4 |
| 1% furfural | 2 |
| 1% levulinic acid | 3 |

While the foregoing examples illustrate the purification of titanium, the process of the present invention is equally applicable to the other reactive refractory metals of groups IVB, VB and VIB of the periodic table which may be prepared by the liquid phase or vapor phase reaction of their halides with an alkali and/or alkaline earth metal.

What is claimed is:

1. A method for purifying a reactive, refractory metal selected from groups IVB, VB and VIB of the periodic table which is contaminated with at least one impurity selected from the group consisting of alkali metals, alkali metal halides, alkaline earth metals, alkaline earth metal halides, and subhalides of said reactive refractory metal which comprises leaching said contaminated reactive, refractory metal with an aqueous acid solution containing from about 0.25 weight percent up to the limit of solubility of at least one water-soluble additive selected from the group consisting of reducing sugars, aldoses, ketoses, keto-acids, the corresponding lactones of said keto-acids, keto-hydroxy acids, the corresponding lactones of said keto-hydroxy acids, sugar acids, the corresponding lactones of said sugar acids, furan derivatives wherein the furan ring is intact, and pyron derivatives wherein the pyran ring is intact, said solution being sufficiently acidic to depress hydrolysis of any subhalide of said reactive, refractory metals which are present as an impurity, whereby said impurities are removed from said contaminated reactive, refractory metal without substantial evolution of hydrogen.

2. In the preparation of a reactive, refractory metal selected from groups IVB, VB and VIB of the periodic table by the reduction of a halide of said reactive, refractory metal by at least one reducing metal selected from the group consisting of alkali and alkaline earth metals to produce a reaction product comprising said reactive, refractory metal, a halide of said reducing metal, and unreacted and partially reacted reactants, the improvement which comprises leaching said reaction product with an aqueous acid solution containing from about 0.25 weight percent up to the limit of solubility of at least one water-soluble additive selected from the group consisting of reducing sugars, aldoses, ketose, keto acids, corresponding lactones of said keto-acids, keto-hydroxy acids, the corresponding lactones of said keto-hydroxy acids, sugar acids, the corresponding lactones of said sugar acids, furan derivatives wherein the furan ring is intact, and pyran derivatives wherein the pyran ring is intact, said solution being sufficiently acidic to depress hydrolysis of any subhalide of said reactive, refractory metals which are present as an impurity, whereby said reactive refractory metal is obtained substantially free from contamination by said halide of said reducing metal and unreacted and partially reacted reactants without substantial evolution of hydrogen.

3. In the preparation of titanium by the reduction of a halide of said titanium by at least one reducing metal selected from the group consisting of alkali and alkaline earth metals to produce a reaction product comprising said titanium, a halide of said reducing metal, and unreacted and partially reacted reactants, the improvement which comprises leaching said reaction product with an aqueous acid solution containing from about 0.25 weight percent up to the limit of solubility of at least one water-soluble additive selected from the group consisting of reducing sugars, aldoses, ketoses, keto acids, the corresponding lactones of said keto acids, keto-hydroxy acids, the corresponding lactones of said keto-hydroxy acids, sugar acids, the corresponding lactones of said sugar acids, furan derivatives wherein the furan ring is intact, and pyran derivatives wherein the pyran ring is intact, said solution being sufficiently acidic to depress hydrolysis of any subhalide of said reactive, refractory metals which are present as an impurity, whereby said titanium is obtained substantially free from contamination by said halide of said reducing metal and unreacted and partially reacted reactants without substantial evolution of hydrogen.

4. A process in accordance with claim 3 wherein said water-soluble additive is mannose.

5. A process in accordance with claim 3 wherein said water-soluble additive is arabinose.

6. A process in accordance with claim 3 wherein said water-soluble additive is fructose.

7. A process in accordance with claim 3 wherein said water-soluble additive is sorbose.

8. A process in accordance with claim 3 wherein said water-soluble additive is gluconic acid.

9. A process in accordance with claim 3 wherein said water-soluble additive is glucono-lactone.

10. A process in accordance with claim 3 wherein said water-soluble additive is glucuronic acid.

11. A process in accordance with claim 3 wherein said water-soluble additive is glucurono-lactone.

12. A process in accordance with claim 3 wherein said water-soluble additive is gluco-saccharic acid.

13. A process in accordance with claim 3 wherein said water-soluble additive is galacturonic acid.

14. A process in accordance with claim 3 wherein said water-soluble additive is galacturono-lactone.

15. A process in accordance with claim 3 wherein said water-soluble additive is gluco-heptonic acid.

16. A process in accordance with claim 3 wherein said water-soluble additive is gluco-heptonic-lactone.

17. A process in accordance with claim 3 wherein said water-soluble additive is ascorbic acid.

18. A process in accordance with claim 3 wherein said water-soluble additive is furfural.

19. A process in accordance with claim 3 wherein said water-soluble additive is pyruvic acid.

20. A process in accordance with claim 3 wherein said water-soluble additive is levulinic acid.

21. A process in accordance with claim 3 wherein said water-soluble additive is the oxidation product of sucrose which is equivalent to the oxidation product obtained by the reaction of one part by weight of said sugar with 0.7 to 1.0 part by weight of 70 percent nitric acid at a temperature in the range of from about 60° C. up to about 80° C.

22. A process in accordance with claim 3 wherein said water-soluble additive is the oxidation product of glucose which is equivalent to the oxidation product obtained by the reaction of one part by weight of said sugar with 0.7 to 1.0 part by weight of 70 percent nitric acid at a temperature in the range of from about 60° C. up to about 80° C.

References Cited in the file of this patent

UNITED STATES PATENTS

| | | |
|---|---|---|
| 1,893,870 | Palkin et al. | Jan. 10, 1933 |
| 1,922,816 | McKinney | Aug. 15, 1933 |
| 2,077,298 | Zegler | Apr. 13, 1937 |
| 2,707,149 | McKinley | Apr. 26, 1955 |
| 2,894,801 | Paul | July 14, 1959 |
| 2,992,098 | Boozenny et al. | July 11, 1961 |

FOREIGN PATENTS

| | | |
|---|---|---|
| 1,085,933 | France | Aug. 4, 1954 |

OTHER REFERENCES

Levy, "Metal Industry," May 20, 1955, pages 415–418 (page 417 relied on).